United States Patent [19]
Dorph

[11] 4,030,224
[45] June 21, 1977

[54] LINE GUIDE FOR A FISHING ROD

[75] Inventor: Thor Dorph, San Francisco, Calif.

[73] Assignee: Bjorn Lie and Gina Lie, both of Oslo, Norway

[22] Filed: May 27, 1976

[21] Appl. No.: 690,708

[52] U.S. Cl. .................................................. 43/24
[51] Int. Cl.² ...................................... A01K 87/04
[58] Field of Search ......................................... 43/24

[56] References Cited

UNITED STATES PATENTS

| | | | |
|---|---|---|---|
| 2,561,675 | 7/1951 | Ross | 43/24 |
| 2,778,141 | 1/1957 | Haas | 43/24 |

FOREIGN PATENTS OR APPLICATIONS

| | | | |
|---|---|---|---|
| 371,581 | 4/1932 | United Kingdom | 43/24 |
| 1,132,624 | 11/1968 | United Kingdom | 43/24 |

*Primary Examiner*—J. N. Eskovitz
*Assistant Examiner*—Daniel J. Leach
*Attorney, Agent, or Firm*—Kemon & Estabrook

[57] ABSTRACT

A line guide for a fishing rod includes a resilient wire mounting frame for attachment to a rod in the conventional manner. The line guiding portion is an annular ring having a grooved periphery which snaps into the wire mounting frame. The configuration of the frame and the groove are such that the ring is held against rotation in any one of several rotatably adjustable positions and these may be changed without removing a line threaded through the guide.

2 Claims, 4 Drawing Figures

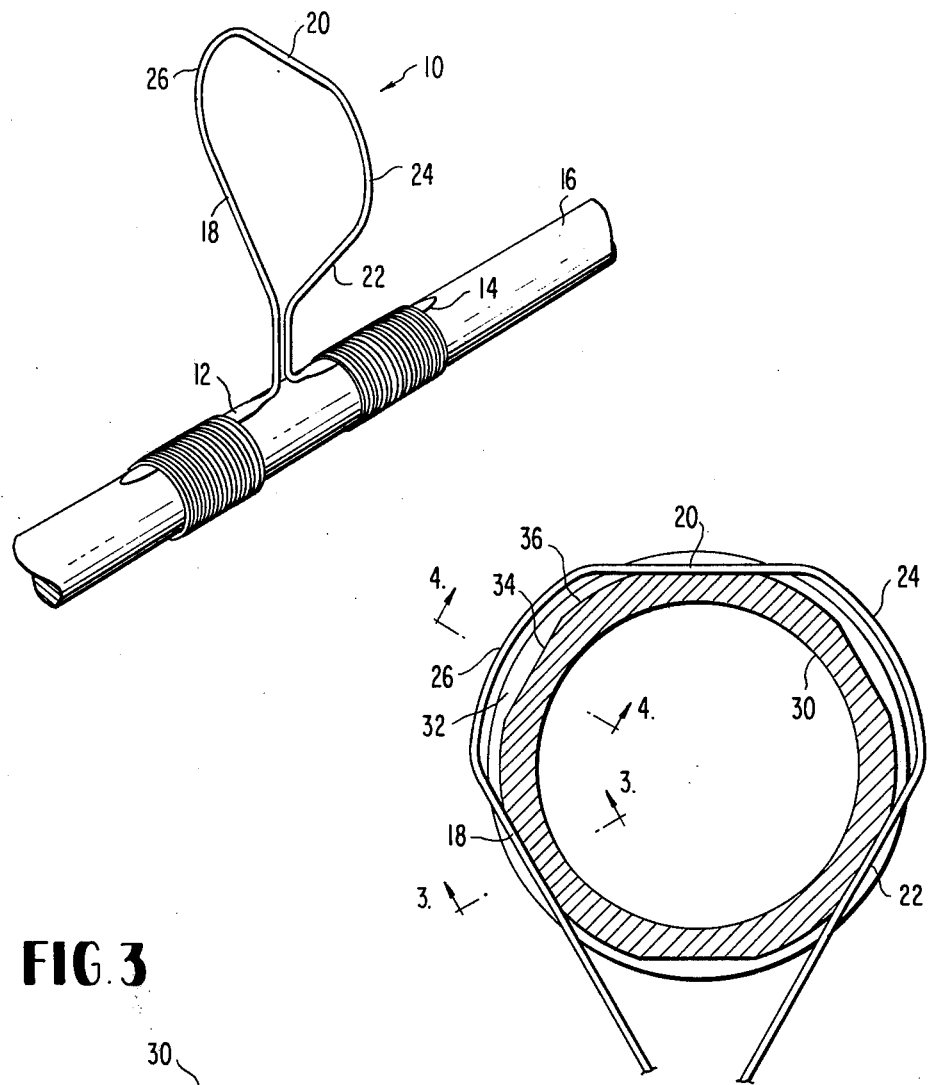
FIG.1
FIG.2
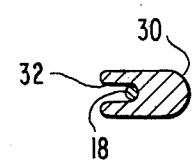
FIG.3
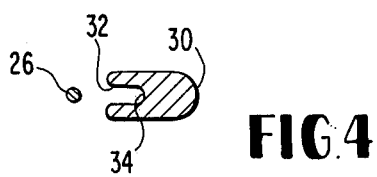
FIG.4

LINE GUIDE FOR A FISHING ROD

BACKGROUND OF THE INVENTION AND REFERENCE TO PRIOR ART

Interchangeable and/or repositionable ring inserts for fishing rod line guides are known and examples may be found in any one of the following U.S. Pat. Nos.: Mitchell—U.S. 682,730, 1901 Ross—U.S. 2,561,675, 1951 Haas—U.S. 2,778,141, 1957 Clarke—U.S. 3,117,388, 1964 Cwik—U.S. 3,171,228, 1965 Bartoletti—U.S. 3,403,468, 1968.

Of the above, the Ross and Haas patents both employ a resilient wire frame for supporting a basically annular insert in a plane perpendicular to the longitudinal axis of the rod. In Ross, the peripherally grooved ring 16 as shown most clearly in FIG. 5 is flattened on one side as shown at 16B. While readily replaceable, the ring 16 can be mounted only in the one position shown for example in FIG. 4. The ring 10 of Haas on the other hand can be supported in its frame in either of two positions, but changing from one to the other requires removing the ring turning it end over end 180° and reinserting it in the frame. Obviously the fishing line must first be removed before such change can be effected. Another drawback to the Haas structure is that it requires very close manufacturing tolerance to prevent too much movement between the ring and the frame when in use.

BRIEF SUMMARY OF THE INVENTION

The line guide of the present invention employs a resilient wire frame to support an annular ring having a grooved periphery which snaps into the wire frame. The groove has circular bottom portions alternating with substantially equally spaced flat bottom portions and the wire frame has straight portions which match the flats of the groove, interconnected by circular sections of larger radius than the outside radius of the ring. Thus the ring can be snapped into the frame and held in any one of a plurality of rotary positions which are changeable without removing the ring from the frame.

BRIEF DESCRIPTION OF THE DRAWINGS

FIG. 1 is a perspective view of a resilient wire frame in accordance with the invention FIG. 2 is a sectional view of a ring in accordance with the present invention and showing the ring mounted in the frame of FIG. 1;

FIG. 3 is a section on the line 3—3 of FIG. 2; and

FIG. 4 is a section on the line 4—4 of FIG. 2.

DETAILED DESCRIPTION

Referring first to FIG. 1, a preferred configuration of the resilient wire frame 10 is shown. It is contemplated that the frame will have oppositely disposed foot portions 12 and 14 to facilitate attachment to the rod 16 by conventional wrappings well known to those skilled in the art. The frame 10 includes three straight sides 18, 20 and 22 which are interconnected by circular portions 24 and 26. It is intended that the three straight portions 18, 20 and 22 would if extended form a substantially equilateral triangle.

Referring now to FIG. 2, the actual line guiding portion of this structure, in the form of a substantially annular ring 30, is shown in section assembled into the wire frame guide of FIG. 1. The ring 30 has a peripheral groove indicated at 32 which extends completely around the ring. Portions of the bottom of the groove 32, however, are flat at a plurality of equally spaced locations one of which is indicated at 34. In between adjacent flat or straight bottom portions 34 are circular portions 36 and these straight and circular portions alternate all the way around the ring. As shown in FIG. 2, there are six flat portions 34.

The resilient frame of FIG. 1 is so dimensioned that the straight portions 18, 20 and 22 thereof will engage with every other one of the flat portions 34 of the groove in the ring 30 when the ring is snapped into the frame. The circular portions of the frame 24 and 26 are of a radius slightly larger than the outside radius of the ring 30 so that in the assembled position of the ring within the frame these lie beyond the periphery of the ring as indicated in FIGS. 2 and 4.

From the foregoing description, it will be obvious that the ring 30 is resiliently but indexably held within the frame and it may be moved around to the next locking position without first removing it from the frame. Obviously, this permits a fresh wear surface to be positioned at that location which receives maximum wear from the passage of the line in contact with the inner surface of the ring. In the event that it becomes necessary to replace a ring, the spacing between the portions 26 of the frame and the outer periphery of the ring are useful to permit the insertion of a tool for facilitating snapping of the ring out of the frame.

It is contemplated that the material of the resilient frame could be stainless steel whereas the ring could be constructed of either metal or plastic. A relatively soft material such as nylon or teflon would produce a minimum of wear on the line whereas a harder material such as tungsten carbide which is frequently used in line guides would be preferred by others.

While as shown in FIG. 1, the base of the equilateral triangle is remote from and the apex closest to the axis of the rod, it will be apparent that these positions could be reversed if desired.

While a preferred embodiment has been herein shown and described, applicant claims the benefit of a full range of equivalents within the scope of the appended claims.

I claim:

1. A line guide for a fishing rod comprising:
   an annular ring;
   means defining a groove in the periphery of said ring, said groove having a plurality of substantially equally spaced flat bottom portions interconnected by circular segments of equal radius and spaced circumferentially around said ring; and
   resilient wire means for mounting on a fishing rod for supporting said ring in a plane perpendicular to the axis of the rod in any one of a plurality of rotatable indexable positions, said wire means extending around said ring and having at least three straight sections which engage with said flat bottom portions of the groove in said ring at substantially equally spaced locations around the circumference of said ring, said straight portions being interconnected by substantially circular segments lying outside the outer diameter of said ring when said ring is snapped into said wire means.

2. A guide as defined by claim 1 in which the peripheral groove in said ring has six flat bottom portions and said wire means has three straight sections.

* * * * *

UNITED STATES PATENT OFFICE
CERTIFICATE OF CORRECTION

PATENT NO. : 4,030,224

DATED : June 21, 1977

INVENTOR(S) : Thor Dorph

It is certified that error appears in the above-identified patent and that said Letters Patent are hereby corrected as shown below:

Page 1, Item 73, after "Norway" insert

-- ; part interest to each --.

Signed and Sealed this

Twenty-third Day of May 1978

[SEAL]

Attest:

RUTH C. MASON
Attesting Officer

LUTRELLE F. PARKER
Acting Commissioner of Patents and Trademarks